June 2, 1970  R. T. FIELDS ET AL  3,515,778

CONTINUOUS MOLDING OF THERMOPLASTIC RESIN

Filed March 2, 1967

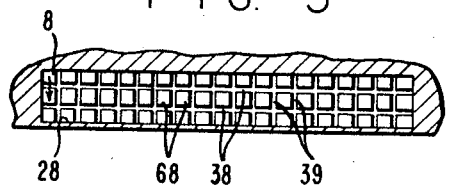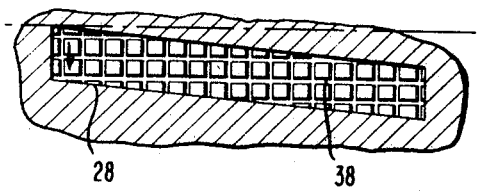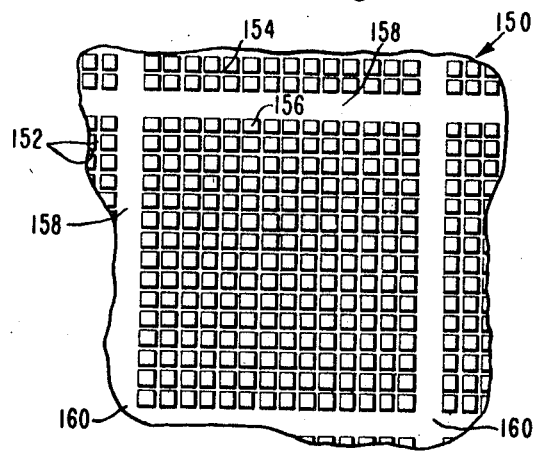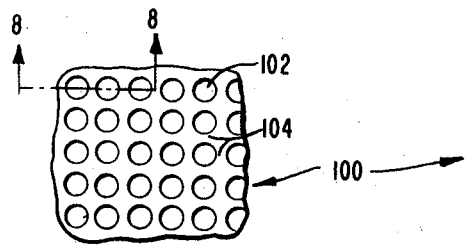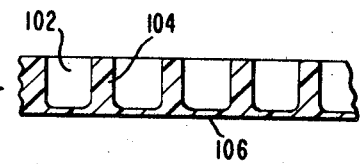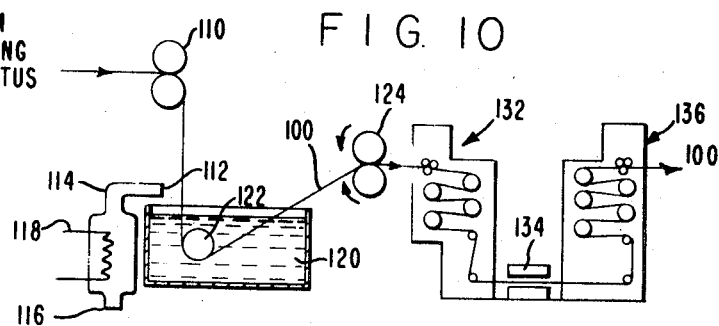

June 2, 1970      R. T. FIELDS ET AL      3,515,778
CONTINUOUS MOLDING OF THERMOPLASTIC RESIN
Filed March 2, 1967      4 Sheets-Sheet 4
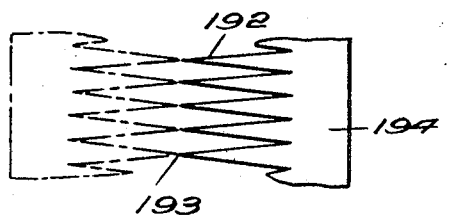
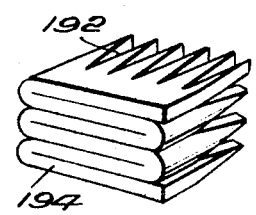
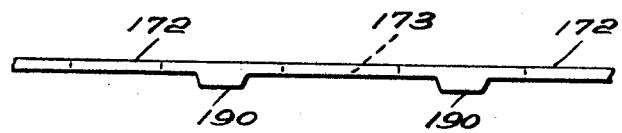
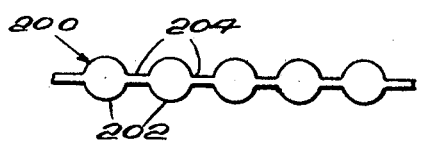
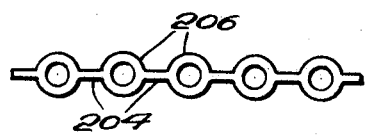
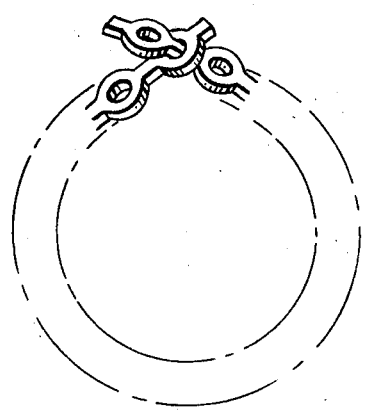

United States Patent Office 3,515,778
Patented June 2, 1970

3,515,778
CONTINUOUS MOLDING OF THERMOPLASTIC RESIN
Reuben T. Fields and Martval J. Hartig, Wilmington, Del., assignors to E. I. du Pont de Nemours and Company, Wilmington, Del., a corporation of Delaware
Continuation-in-part of application Ser. No. 552,191, May 23, 1966. This application Mar. 2, 1967, Ser. No. 619,994
Int. Cl. B29f 3/012, 3/08; B29d 7/14
U.S. Cl. 264—40                                14 Claims

ABSTRACT OF THE DISCLOSURE

Molten thermoplastic resin, e.g., polyethylene is forced into a pattern on the surface of rotating rolls to form a web of the resin with the roll pattern in its surface; typical patterns include screen and filament patterns.

---

This application is a continuation-in-part of copending application Ser. No. 552,191, now abandoned, filed May 23, 1966, by the same inventors.

This invention relates to the continuous molding of molten thermoplastic resin into a web.

A method which is capable of continuously molding molten thermoplastic resin into intricate patterns at high rates of production has not heretofore been forthcoming from the art.

Such a method and apparatus therefor has now been discovered, in which the molten thermoplastic resin is molded into a continuous web containing a pattern.

In one embodiment of this discovery, pressurized molten thermoplastic resin is passed, substantially free of pressure drop along a laterally confined path which terminates at an outlet which is in pressure-seal relation with a relatively cool patterned solid surface moving across the outlet, whereby the molten resin is forced into the pattern of the surface to continuously mold a patterned web which is removed from the surface at a point remote from the outlet. Apparatus for carrying out this process includes structure, such as a patterned roll, defining the moving patterned solid surface, a source of pressurized molten thermoplastic resin, die means communicating between the source and the surface and having its outlet in pressure-seal relation with the latter for receiving resin from the source and directing the resin through its outlet, without any substantial loss of pressure, against the patterned surface, whereby the pressure upon the resin forces it into the pattern of the surface to continuously mold a patterned web of the resin which is then transported away from the die means by the movement of the surface, and means for cooling the surface so as to chill the resin coming into contact therewith.

The pressure upon the molten resin within the die means is present at the interface between the outlet of the die means and the patterned surface and is available for a sufficient duration to cause even intricate patterns to be filled at high speeds of movement of the surface. Surprisingly, these molding results are not precluded by the chilling of the molten thermoplastic resin coming into contact with the patterned surface. Further surprising is the fact that thin films on the order of 0.001 to 0.005 in. thick, can be molded despite chilling of the molten resin in contact wtih the patterned surface.

In another embodiment of the present discovery, the same pressure seal relation between the outlet of the die means and patterned surface is maintained, except that the outlet includes a wedge-shaped passage extending in the direction of movement of the patterned surface and having its base formed by the moving patterned surface. This wedge-shaped passage receives molten resin by drag flow of the resin across the path of the resin within the die means by the patterned surface, and, in turn, forces the received resin into the pattern of the surface. This drag flow pressure augments the pressure upon the resin while passed along the laterally confined path. For simple patterns, drag flow pressure alone is sufficient to obtain pattern filling provided that sufficient molten resin is supplied to the wedge-shaped passage. The wedge-shaped passage also has the effect of increasing the area and time of contact between molten thermoplastic resin and the relatively cool patterned surface during molding, an effect which would be expected to increase molding difficulty. Surprisingly, however, this embodiment, because of the pressure created in the wedge-shaped passage, enables more intricate patterns and even higher production speeds to be attained than with the first described embodiment of this invention.

Another embodiment of the present invention relates to the kinds of webs and processes therefor that can be molded from the apparatus and processes of this invention.

These and other embodiments of the present invention will be more fully described in the following detailed discussion and in the accompanying drawings in which:

FIG. 5 is a view looking at a portion of the surface of a patterned roll from the outlet of the path for molten thermoplastic resin;

FIG. 6 is a view looking at a portion of the surface of a patterned roll from the outlet of the path for molten thermoplastic resin in which the outlet and the pattern are in skewed relationship;

FIG. 7 is a plan view of an area of one embodiment of web produced according to the present invention;

FIG. 8 shows a cross section of the web taken along line 8—8 of FIG. 7;

FIG. 9 shows a plan view of part of another embodiment of web produced according to the present invention;

FIG. 10 shows diagrammatically, apparatus for defilming and longitudinally drawing web;

FIG. 15 shows a side view of another embodiment of web produced according to the present invention;

FIG. 16 shows a plan view of still another embodiment of web produced according to the present invention;

FIG. 17 shows a perspective view of the disposition of the binding strip of the web of FIG. 16 in order to make a brush thereof;

FIG. 18 shows a plan view of still another embodiment of filamentary shape that can be produced according to the present invention;

FIGS. 19 and 20 show a plan view and side view, respectively, of a variation on the embodiment of FIG. 18; and FIG. 21 shows the filamentary shape of FIGS. 19 and 20 interlocked with itself so as to be useful for tying.

Figure 1:
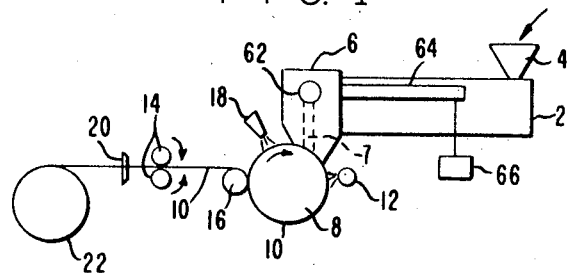
FIG. 1 is a diagrammatic representation of a continuous molding line incorporating features of this invention.

Referring now to the drawings, in FIG. 1 is shown an extruder 2 equipped with a hopper 4 for receiving thermoplastic resin. The extruder 2 works the resin and melts it under pressure. A die 6 receives the pressurized molten resin through its rear (hidden) side from the extruder and passes the resin along a path 7 which terminates in an outlet in pressure-seal relation with a rotating patterned roll 8 and directs the resin substantially free of pressure drop and in the absence of air into the pattern of the roll. The roll 8 continuously moves the molten resin away from the outlet of path 7, thereby forming a continuous molded web 10 having a pattern which is complementary to that of the roll. The web 10 is chilled by a flume or water spray 12, and after sufficient contact with the roll 8 which is internally cooled, the cooled web is removed from the roll by take-off rolls 14 aided by a stripper roll 16 and mold release agent applied by spray nozzles 18 to the surface of the roll prior to passage under die 6. Longitudinal dividing or trimming of web 10 is accomplished by one or more blades 20 positioned between the take-off rolls 14 and reel 22.

Figure 2:
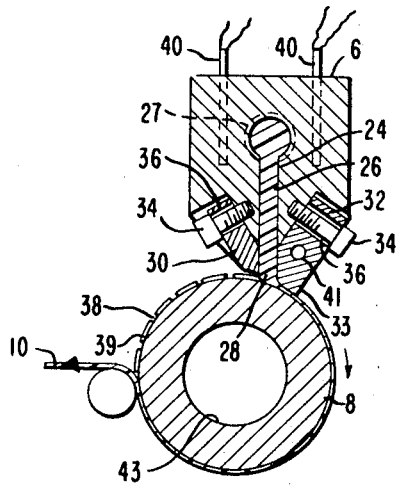
FIG. 2 shows, in cross section, one embodiment of molding apparatus for use in the molding line of FIG. 1.

To further describe the die 6 and patterned roll 8, which comprise the molding apparatus of this invention, FIG. 2 shows one embodiment in which die 6 contains a cavity 24 serving as path 7 (FIG. 1) and which is supplied with molten thermoplastic resin 26 through inlet pipe 27 by extruder 2. Cavity 24 terminates in a slot-shaped outlet 28 extending across the surface of roll 8. The rearward and forward edges of outlet 28 are defined by a die plate 30 and a doctor blade 32, each adjustably spaced from roll 8 and secured to die 6 by bolts 34 extending through slots 36. The pressure upon the molten resin 26 in the cavity forces the resin through outlet 28 and into the roll pattern represented by transverse grooves 38 (enlarged in spacing and width for clarity) and intersecting grooves 39. The cavity 24 and outlet 28 are substantially free of constriction so that the pressure on the resin at the surface of roll 8 is substantially the same as the pressure on the resin in cavity 24.

The grooves 38 and 39 mold one surface of the web 10. The opposite surface of the web is formed by doctor blade 32 which is adjustably spaced from roll 8 to give the web thickness desired. Thus, a web consisting of intersecting strands or ribs corresponding to the grooves 38 and 39 can be obtained, with either apertures being present between the strands or a continuous film forming one surface of the web. Die 6 is heated to a temperature above the resin melting temperature of the particular resin being used, by electrical heating elements 40 extending into corresponding wells in the die. The resin melting temperature is the minimum temperature at which a fresh sample of resin leaves a molten trail as it is moved slowly across a heated metal surface. This is also sometimes called the stick temperature.

Doctor blade 32 is heated by an electrical heating element 41 usually to a temperature which is equal to or greater than the temperature maintained in die 6. The outer face 33 of the doctor blade departs sharply from the path of web 10 so as to avoid sticking of the web to the hot doctor blade. The doctor blade can also be notched along its lowermost edge to yield corresponding projections in the molded web. Roll 8 is at a temperature which is at least about 10° C. less than the resin melting temperature of the resin being molded, such as by passing a cooling medium through an interior passage 43.

Figure 3:
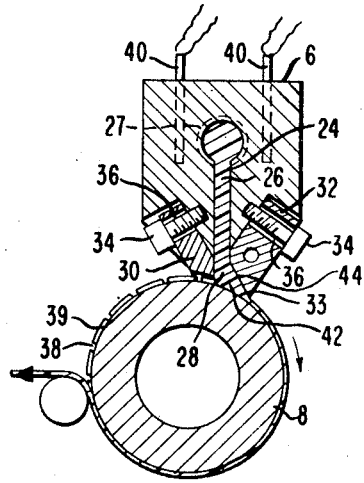
FIG. 3 shows, in cross section, another embodiment of molding apparatus for use in the molding line of FIG. 1.

In FIG. 3 essentially the same equipment arrangement as in FIG. 2 is used except that slot-shaped outlet 28 includes a wedge-shaped passage 42 extending in the direction of rotation of roll 8. The wedge-shape of the passage 42 is formed by roll 8 and doctor blade 32 having a slant surface 44 facing the roll 8. Movement of the surface of roll 8 past the outlet 28 drags molten resin into the passage 42 wherein the flowing resin is forced into the pattern on roll 8. This drag flow pressure created in passage 42 at the surface of the roll augments the pressure on the resin within cavity 24 of the die.

The molding apparatus of FIGS. 2 and 3 can be provided with a water spray 12 and mold release spray nozzles 18 as shown in FIG. 1.

A pressure-seal relation between the outlet 28 for the molten thermoplastic resin and roll 8 is maintained so that the pressure on the resin in cavity 24 and the drag flow pressure, when the apparatus of FIG. 3 is employed, are available to force the resin into the pattern of roll 8 on a continuous and high speed of production basis. Generally, the resin in cavity 24 is under a pressure of at least 50 p.s.i.g. for resins that have fluid melts, such as polyamides, while for the more viscous resins, such as polyethylene, the pressure is generally above 175 p.s.i.g. There is a capability however, of using much higher molding pressures, such as in excess of 1,000 p.s.i.g., depending on the pattern being molded. In some cases, drag flow pressure may be used by itself to attain molding. The pressure-seal relation is obtained, in part, by adjusting the doctor blade 32 to constrict the flow space for the resin as it leaves outlet 28 and by having a sufficient rate of web formation for the viscosity of the particular resin being molded to prevent back flow under the die plate 30 which is generally spaced 2 to 10 mils from the surface of roll 8.

Figure 4:
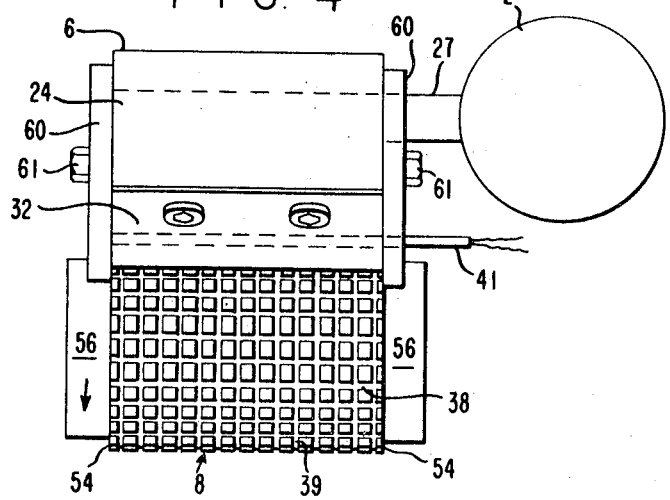
FIG. 4 shows an embodiment for laterally confining molten thermoplastic resin.

FIG. 4 shows means for laterally confining molten thermoplastic resin as it leaves opening 28 so as to complete the pressure-seal relation. In FIG. 4, the doctor blade 32 is shown in operative position and provided with heating element 41. The lateral surface of the roll 8 is provided with a pattern consisting of grooves 38 and 39, terminating at shoulders 54 formed between the surface of the roll and cylindrical ends 56 of reduced diameter extending from each end of the roll. The molten resin from cavity 24 is molded into a web which extends entirely across the grooved pattern. Further sideways flow of the resin, however, is prevented by a pair of end plates 60 adjustably spaced from roll 8 by bolts 61 passing through slots (not shown) in the end plates and tightened into die 6. The end plates 60 each lie close to the shoulders 54 and have a lower arcuate surface lying close to the corresponding surface of cylindrical ends 56. This close spacing, on the order of several mils, permits a small amount of molten resin to enter the tortuous path around shoulders 54 before chilling of the resin occurs. This chilling prevents sideways leakage of additional resin and loss of molding pressure. A low-friction pressure sealing system, without the need for metal-to-metal contact or necessity for further lubrication, is provided by this small amount of resin entering between end plates 60 and roll 8. The end plates 60 also form the lateral sides for cavity 24 and the die outlet 28 which are coextensive therewith.

Means can also be provided for allowing the spacing between the die 6 and the roll 8 to change to compensate for pressure fluctuations caused by extruder 2 so as to maintain a constant force on the resin entering the roll pattern. Exemplary of such means is the pivotal mounting of die 6 about a stub shaft 62, which is on center with the feed line between extruder 2 and the die, and providing a lever arm 64 having the desired weight 66 suspended therefrom as shown in FIG. 1. Excessive molding pressure is relieved by the die 6 rotating away from roll 8. Upon return of the pressure to normal, weight 66 restores the die 6 to its former position to produce web of the desired thickness.

To fill intricate patterns in the surface of the roll rotating at a given speed, not only must the pressure on the resin and its volume be sufficient, but the pressure must also be supplied for sufficient duration to cause the resin to flow into the pattern. To accomplish this, it is preferred, where possible depending on the pattern, to have the width of outlet 28 in the direction of rotation of roll 8 greater than at least one repeat unit in the pattern. This relationship is depicted in FIG. 5 wherein roll 8 is rotating in the direction indicated beneath die outlet 28 which can be the die outlet of die 6 of FIG. 2 or of die 6 of FIG. 3 including the wedge-shaped passage 42. The pattern in the surface of roll 8 consists of rows of squares 68 formed by transverse grooves 38 and circumferential grooves 39 intersecting therewith. The width of outlet 28, and thereby the width of the mass of pressurized molten thermoplastic resin in contact with the roll surface is greater than the width of one square 68 plus one groove 38 and is thereby greater than one repeat unit of the pattern. By way of example, the squares 68 can measure ⅛ in. on a side, the grooves 38 and 39 can measure 0.005 in. wide and 0.035 in. deep, the die cavity can be ¼ in. wide, and the die outlet can be 1 in. wide including the wedge-shaped passage, the die cavity and outlet measurements being made in the direction of rotation of the roll.

FIG. 6 shows an alternate arrangement of the die outlet 28 with respect to the pattern of roll 8, in which the die outlet is in skewed relationship with the grooves 38 so as to make uniform the demand of the pattern for molten thermoplastic resin. In FIG. 6, the outlet 28 is shown slanted from the axis of roll 8 with the grooves 38 being parallel thereto. However, the grooves 38 could just as well be made to slant from the axis of roll 8 while maintaining the pressure seal therewith and with the die outlet 28 being parallel to the roll axis; of course, a different product would result from this alternative.

In FIGS. 7 and 8 are shown an embodiment of web obtainable according to the present invention. The web 100 has the pattern of a screen molded into one surface by a roll having the same pattern in negative relief. The screen pattern consists of rows of spaced circular depressions 102 separated by a network of raised portions, called strands 104 running parallel and perpendicular to the length of the web, and forming one surface of the web. The opposite surface of the web consists of a continuous thin film 106 having a thickness determined by the spacing of the doctor blade from the roll. By way of example, web 100 can be 0.010 in. thick, and have a film 0.001 in. thick, 40 depressions 102 per inch (4 x 4 mesh), and a strand width of 0.010 in. This can be formed of linear polyethylene or polypropylene at a molding pressure of 250 p.s.i., molding temperature of 250° C., roll temperature of 80° C., and surface speed (of the roll) of 150 ft./min. The intersections of strands 104 form rounded corners between strands coming into the intersections.

The film 106 can be removed, and thus the meshes of the screen pattern opened, by heating the web 100 sufficiently to melt the film, which results in the film retreating or drawing-back into the strands 104. The heating should be insufficient to melt or otherwise damage the resultant screen. Thermoplastic resins, particularly polyamides, tend to degrade when heated in the presence of oxygen at temperatures required for melting the film. Degradation can be avoided, however, by carrying out the heating very quickly and thereafter immediately quenching the defilmed web, or by excluding oxygen.

FIG. 10 shows apparatus for carrying out defilming as well as for longitudinally drawing web. The web, such as web 100, is passed through the nip of feed rolls 110 and downwardly in front of outlet 112 of a heater 114. The heater 114 receives air through inlet 116 and heats it to 700–800° C. by means of heating element 118, shown diagrammatically. The defilmed web is immediately quenched in water bath 120 at tap temperature as the web travels around guide roll 122 positioned therein and then through take-off rolls 124.

Web produced according to the present invention can be longitudinally drawn such as shown for the defilmed web 100 in FIG. 10. The web is passed around a first series of rolls 132 which tend to grip the web, through a heater 134 which heats the web 100 on both surfaces to a suitable temperature below the resin melting temperature of the resin of which the web is composed, and then around a second series of gripping rolls 136 which travel at a faster rate than the first series 132, thereby drawing and orienting the web to the degree desired.

Figure 11:
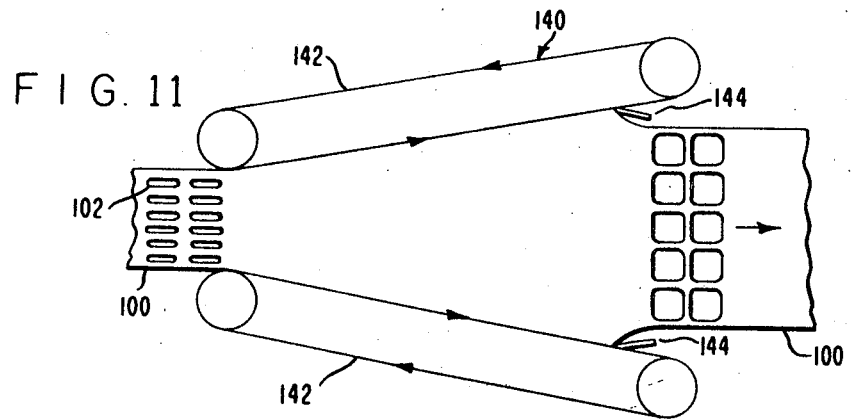
FIG. 11 shows diagrammatically, apparatus for transversely drawing web.

Web produced according to the present invention can also be transversely drawn to the degree desired. For example, in FIG. 11, the longitudinally drawn web 100 of FIG. 10 is depicted with its depressions 102 now being elongated apertures, as the web, suitably heated at a temperature below the resin melting temperature of the resin, enters a transverse drawing machine 140 consisting of diverging tensioning conveyors 142 operating in the direction indicated and having closely spaced clips (not shown) for gripping the edges of the web to draw it as the web 100 advances through the machine. Blades 144 are provided for releasing the web from the clips. The elongated apertures 102 in the web are transformed to rounded corner, rectangular-shaped apertures in the transversely drawn web. Thus, the screen mesh molded into the web as formed by the molding apparatus of this invention can be made into a much coarser mesh with the attendant advantage of increasing the strength of the screen by virtue of its biaxial orientation. For example, the 40 x 40 mesh pattern in a web of linear polyethylene, as previously described, can be drawn to a 10 x 10 mesh.

Generally, the apparatus for longitudinally and transversely drawing web made according to the present invention is conventional. The shape of the depressions 102 molded into the web can be varied from the circular form shown to a polygonal form, such as squares, or other forms, by correspondingly altering the mold pattern in the roll 8. The strands of the web, whether the web be defilmed, or uniaxially or biaxially oriented have integrally molded intersections. Some of the uses of screening made according to the present invention are as insect barriers, lace and other decorative fabrics, buckram, crinoline, and other non-woven fabrics.

Reinforcing scrim is another use for screening made according to the present invention. Reinforcing scrim characteristically has high strength in one direction but little strength in the transverse direction. Biaxially oriented screening of the present invention overcomes this disadvantage by having high strength in both directions. The preferred biaxial draw is at leats 2.5 times and preferably at least 3 times in each direction; high density polyethylene screening is preferably biaxially drawn at least 4 times the original screening dimension. A particularly useful biaxially drawn scrim has from 2 to 3 strands per inch arranged in a square pattern and having a strand cross-section of about 0.025 in. on a side. Such a product has a breaking strength of about 30 lbs. per in. of width. To maintain good intersection strength of drawn screening, the intersections should include rounded corners, between strands, before drawing as well as thereafter.

Another use of screening made according to the present invention is tobacco shade cloth. FIG. 9 shows an embodiment of screening which is especially suited for this purpose. This screen 150 consists of strands 152 having integrally molded intersections 154 and defining essentially square-shaped apertures 156. The screen 150 also consists of thickened reinforcing strands 158 having integrally molded intersections 160 and integrally molded with the strands 152. The reinforcing strands 158 are spaced as required to support the screen 150 and the strands 154 and apertures 156 are sized to provide the required shade. The screen 150 thereby, combines both strength and lightness-in-weight.

Figure 12:
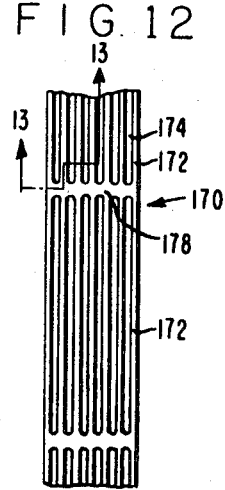
FIG. 12 shows a plan view of an area of another embodiment of web produced according to the present invention.
Figure 13:
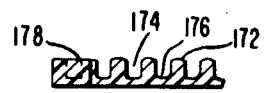
FIG. 13 shows a cross section taken along line 13—13 of the web of FIG. 12.

FIGS. 12 and 13 show another embodiment of web that can be made according to the present invention, in which a plurality of precision filamentary shapes, such as filaments or ribbons, can be made at the same time. This web 170 consists of longitudinally extending filamentary shapes 172 which are separated from one another along most of their length by elongated depressions 174 which either extend through the web or bottom against a film 176, and, optionally, are joined together by longitudinally spaced transverse strands 178 in a line which is substantially perpendicular to the filamentary shapes 172. The transverse strands 178 in this embodiment of web, if present at all, are spaced widely apart relative to the spacing between filamentary shapes. Generally, the strand spacing will exceed the filamentary shape spacing by at least 5 times and more often by at least 10 times. The film 176 is generally between 0.001 to 0.010 in. The web 170 or the filamentary shapes 172 thereof can be treated to any of the post-forming operations, usually accorded such products, such as defilming, uni-axial draw, and biaxial drawn, as hereinbefore described.

The filamentary shapes 172 can be separated from one another by defilming or by longitudinally dividing such as shown with blade 20 in FIG. 1. In particular, web such as web 170 provides an economical source for (a) precision-made ribbon which can be longitudinally oriented to form strapping and (b) filaments which can be used for textile or other purposes. Filaments obtained in this fashion can be given textile treatments such as crimping and fibrillation in either the separated form or in the form of the web containing the filaments. The resultant bulkier filaments and webs can be used in a similar manner to existing bulky textiles. The filament webs can also be laminated to one another in criss-cross fashion to form burlap type material, filters, stiffened material, reinforcement material or filters.

Representative details for the manufacture of a web of filamentary shapes such as precision ribbon are as follows: The roll 8 is 10¾ in. in diameter and has five circumferential grooves 0.550 in. wide x 0.100 in. deep separated by ribs 0.125 in. wide which fit into corresponding notches in the die plate 30 to prevent back-flow of molten polymer. Clearance between the roll and the doctor blade 32 is about 0.007 in. A drag flow type of die such as shown in FIG. 3 operating at temperatures of from 280° C. is used, the resin used is polyhexamethylene adipamide, and the roll is rotated at a surface speed or 40 ft./min. and maintained at a temperature of about 110° C. Stearic acid mold release agent is used at start-up and thereafter water is used for this purpose. The resultant web consists of ribbons corresponding in dimensions to the grooves in the roll and longitudinally joined together by a film about 0.007 in. thick which is removed from the ribbons by cutting. No crossovers are present.

These conditions can also be used to mold a single ribbon 3½ in. wide by using a correspondingly grooved roll 8.

Figure 14:
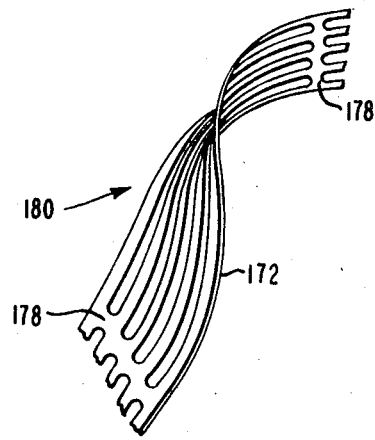
FIG. 14 shows a twisting of an embodiment of the web of FIG. 12 to make rope.

FIG. 14 shows the forming of a rope-like structure 180 by twisting the filamentary shapes 172 of FIG. 12, in the form of filaments, around one another before or after removal of any film 176 that is present. When the transverse strands 178 are continuous and perpendicular with respect to the filamentary shapes 172, as shown in FIG. 12, the resultant rope-like structure will be chain-like in appearance. By having the transverse strands 178 run diagonally instead of transversely, the rope-like structure will present a more smooth appearance. Preferably, the filaments are longitudinally oriented before twisting to give the resultant rope greater strength. Lubricant may be disposed between adjacent filaments to reduce friction upon twisting. The twisted configuration of the filaments can be retained by heat setting.

The web 170 of FIG. 12 can be made with thickened transverse strands 190 which extend out of the plane of the filamentary shapes 172, preferably oriented, as shown in FIG. 15. Such a web is useful as a driving or conveying belt when disposed in a closed loop about sprockets which are suitably formed so as to mate with the thickened strands 190. The spacing between strands 190 and the profile shape thereof can be varied as desired for this purpose. Alternatively, the transverse spacing between filamentary shapes 172 can form apertures 173 which can be used for engagement with sprocket teeth much in the same way as a roller chain.

The filamentary shapes which can be made according to the present invention can also have a varying longitudinal cross-section derived from grooves of varying depth andor width in the pattern of roll 8. For example, tapered filaments 102 can be made integrally joined at their thick ends of a binding strip 194, as shown in exaggerated thickness and width in FIG. 16. These filaments can be made in the form of a web having the solid plus the dashed-line outline shown in FIG. 16, followed by severing of opposing filaments at their narrowest point 193. The filaments can be made extending in a direction which is either parallel or transverse to the machine direction and can be given any of the treatments as described for web 170. The binding strip 194 can be repeatedly overlapped upon itself as shown in FIG. 17 to give an assemblage of tapered filaments 192, preferably oriented, which resemble a brush. The binding strip end of this assemblage can be attached to a handle by conventional brush manufacturing techniques to form a brush in which each filament is integrally secured to one another by the overlapped binding strip 194. Alternatively, the brush can be made by severing the binding strip into short lengths and stacking these lengths on top of one another or by rolling the binding strip over onto itself.

In another embodiment of filamentary shapes of varying cross section, the filamentary shape can be of a beaded cord 200 consisting of integrally molded spheres 202 and tie filaments 204, as shown in FIG. 18. Such a beaded cord is useful decoratively and for knotting and tying purposes, with the spheres 202 preventing untying of knots formed from the cord. In a variation on this embodiment, the spheres 202 can be replaced by apertured discs 206, as shown in FIGS. 19 and 20. The discs 206 can be folded so that they can pass through the aperture in other discs 206 as shown in FIG. 21, so as to be useful for tying purposes without the requirement for knotting. Other configurations of interlocking sections alternating with tie filaments can be used.

Patterned rolls 8 for making these various patterns in webs can be made by conventional manufacturing techniques. A preferred technique is to make the roll out of a series of discs stacked alongside one another, with pattern of the roll being formed by notches in the periphery of the discs. The discs are mounted on a hollow mandrel which is suitably formed to prevent relative rotation between the discs, and nuts are threadably mounted on the mandrel on each side of the stack of discs to form a tight stack thereof.

The thermoplastic resins which can be molded into webs according to the present invention are those which are extrudable into continuous solid shapes from a heated, molten condition and under relatively high pressures. Examples of suitable thermoplastic resins include polystyrene, high impact polystyrene, ABS resin, the saturated hydrocarbon polymers, such as linear or branched polyethylene, polypropylene and copolymers thereof; ionomers such as described in Canadian Pats. 674,595 and 713,631 both to R. W. Rees; copolymers of ethylene with an $\alpha,\beta$-unsaturated carboxylic acid such as described in British Pat. 963,380 to Du Pont, and blends thereof with saturated hydrocarbon polymers and such blends containing co-crystallized oxide, water activated cross-linking agents such as described in U.S. patent application Ser. No. 248,229, now abandoned, filed Dec. 31, 1962, by Halliwell et al.; halogenated or perhalogenated olefins, such as vinyl chloride polymer and melt fabricable tetrafluoroethylene polymer such as the copolymers thereof with hexafluoropropylene, and chlorotrifluoroethylene polymer; polyvinyl acetate and copolymers thereof with saturated hydrocarbon polymers and optionally, the acid copolymers of British Pat. 963,380 to Du Pont; polymers of $\alpha,\beta$-unsaturated carboxylic acid, such as polymethylmethacrylate; the polyamides such as polyhexamethylene adipamide (66 nylon), polyhexamethylene sebacamide (610 nylon), polycaprolactam (6 nylon), copolymers thereof, and blends of the polyamides with acid copolymers, ionomers, and/or saturated hydrocarbon polymers; polyoxymethylene polymer and copolymer; polycarbonate; polyethylene terephthalate.

The particular molding, defilming, and drawing temperature employed in making and modifying webs such as hereinbefore described will depend on the resin being molded and such operating conditions as the speed of the patterned roll 8 and the intricacy of the pattern therein. The capability of the molding process and apparatus of this invention to mold intricate patterns is intended to refer to a capability of filling patterns having closely spaced grooves and grooves of narrow widths and high depth to width ratios, as well as other intricacies of pattern design. The temperatures will also depend on whether the apparatus of FIG. 2 or FIG. 3 is employed. Typical operating temperatures, including heat stabilization temperature for stabilizing oriented web from shrinkage, for some of the thermoplastic resins suitable for use in the present invention are as follows:

| Resin | Molding temp.,°C. | Draw temp.,°C. | Heat Stabilization temp.,°C. |
|---|---|---|---|
| Linear polyethylene [1] | 200-250 | 50-120 | 90 |
| Branched polyethylene [2] | 180-190 | 20-60 | |
| Polypropylene | 200-250 | 50-135 | 100 |
| Polystyrene | 240-280 | 135 | 90 |
| Polyvinyl chloride | 150-170 | 100 | 95 |
| 66 nylon | 260-350 | 125-230 | 170 |

[1] Frequently called high density polyethylene.
[2] Frequently called low density polyethylene.

The wedge-shaped passage 42 can be of any configuration which augments the molding pressure supplied by the extruder. Generally, the passage 42 will take the form of converging surfaces, with the roll pattern forming one of these surfaces. The pressures required on molten thermoplastic resin in cavity 24 can be less than the full extrusion pressure of the extruder, depending upon which resin is employed and upon operating conditions. The pressure in the cavity 24, however, is substantially the same as the pressure of the resin as it comes into contact with the pattern of the roll surface. When such pressure is insufficient, the drag flow arrangement of FIG. 3 can be used to increase the force present for continuously filling the pattern with molten resin. The depth of the grooves forming the pattern in roll 8 need not be uniform. Thus, it is apparent that the process and apparatus of this invention is also useful for molding of articles such as are now injection molded, with the continuous film produced in the present invention resembling the flash obtained in injection molding.

What is claimed is:

1. A process for the continuous molding of molten thermoplastic resin into a web, comprising passing molten thermoplastic resin along a laterally confined path which terminates in an outlet having a wedge-shaped passage in pressure-seal relationship with a patterned surface which is cool relative to the temperature of said molten thermoplastic resin and is moving across said outlet, the wedge-shaped passage extending in the direction of movement of said patterned surface, whereby drag flow of said molten thermoplastic resin into said wedge-shaped passage forces said molten thermoplastic resin into the pattern of said surface, cooling the web, and removing the cooled web from said patterned surface at a point remote from said outlet.

2. The process of claim 1 wherein said molten resin in said path is under pressure and is passed through said outlet substantially free of pressure drop.

3. The process of claim 1 wherein said patterned surface is the surface of a roll.

4. The process of claim 1 wherein said web has a screen pattern molded therein.

5. The process of claim 1 wherein said web has a pattern of longitudinally extending filamentary shapes molded therein.

6. The process of claim 5 wherein said filamentary shapes are joined together by a thin film.

7. The process of claim 5 wherein said filamentary shapes are joined together by transverse strands spaced apart at least 5 times the distance between said filamentary shapes.

8. The process of claim 1, including the step of changing the spacing of said outlet from said patterned surface in response to changes in the pressure upon the resin so as to maintain said force upon the resin relatively constant.

9. The process of claim 1 wherein the pattern of said patterned surface consists predominantly of a plurality of grooves extending parallel to the direction of movement of said surface, whereby the resultant web contains a filamentary shape corresponding to each groove in said pattern.

10. The process of claim 9 wherein the resultant filamentary shapes are longitudinally joined to one another by a thin film.

11. The process of claim 10 wherein the thin film is from about 0.001 to 0.010 in. thick.

12. The process of claim 10 including the step of separating at least one end of said filamentary shapes from each other.

13. The process of claim 9 wherein the resultant filamentary shapes are joined together at widely spaced longitudinal points relative to the spacing between said filamentary shapes.

14. Apparatus for continuously molding thermoplastic resin, comprising structure defining a moving surface having a pattern therein, die means having an outlet positioned in pressure-seal relation with said moving surface for directing molten thermoplastic resin through said outlet into said pattern, said outlet including a wedge-shaped passage extending in the direction of movement of said surface, with the pattern of said surface forming the base of said wedge-shaped passage, whereby drag flow of said molten thermoplastic resin into said wedge-shaped passage forces said molten thermoplastic resin into said pattern to obtain a continuous web of said molten thermoplastic resin, and means for cooling said surface at said outlet to have a temperature less than said molten thermoplastic resin.

References Cited

UNITED STATES PATENTS

| | | | |
|---|---|---|---|
| 2,624,914 | 1/1953 | Rhodes | 264—216 |
| 2,944,285 | 7/1960 | Rhodes | 18—12 |
| 3,085,292 | 4/1963 | Kindseth | 284—216 |
| 3,196,196 | 7/1965 | Burbank | 18—21 |

FOREIGN PATENTS 696,904  10/1964  Canada.

ROBERT F. WHITE, Primary Examiner

J. R. THURLOW, Assistant Examiner

U.S. Cl. X.R.

18—12, 21; 156—244; 161—116; 264—147, 160, 167 216